United States Patent
Yasui

(10) Patent No.: US 9,413,146 B2
(45) Date of Patent: Aug. 9, 2016

(54) WIRING SUPPORT STRUCTURE

(71) Applicant: NABTESCO CORPORATION, Tokyo (JP)

(72) Inventor: Tsutomu Yasui, Gifu (JP)

(73) Assignee: NABTESCO CORPORATION, Tokyo (JP)

( * ) Notice: Subject to any disclaimer, the term of this patent is extended or adjusted under 35 U.S.C. 154(b) by 178 days.

(21) Appl. No.: 14/282,976

(22) Filed: May 20, 2014

(65) Prior Publication Data

US 2014/0345901 A1  Nov. 27, 2014

(30) Foreign Application Priority Data

May 27, 2013  (JP) .................. 2013-111210

(51) Int. Cl.
*H02G 1/00* (2006.01)
*H02G 3/32* (2006.01)

(52) U.S. Cl.
CPC ... *H02G 1/00* (2013.01); *H02G 3/32* (2013.01)

(58) Field of Classification Search
CPC .................................. H02G 1/00; H02G 3/32
See application file for complete search history.

(56) References Cited

U.S. PATENT DOCUMENTS

| | | | | |
|---|---|---|---|---|
| 2,140,376 A | * | 12/1938 | Anderson | H02B 1/202 361/826 |
| 2,455,141 A | * | 11/1948 | Runge | F21V 21/00 24/569 |
| 3,740,614 A | * | 6/1973 | Baso | H05K 7/02 174/72 A |
| 3,819,988 A | | 6/1974 | Pöllmann et al. | |
| 5,769,365 A | | 6/1998 | Onishi et al. | |
| 5,967,467 A | * | 10/1999 | Onishi | F16L 3/04 248/223.41 |
| 7,060,899 B1 | * | 6/2006 | Hoefer | H02G 1/00 16/2.1 |
| 7,075,010 B2 | * | 7/2006 | Santelli, Jr. | H02G 3/0418 174/34 |
| 7,373,759 B1 | | 5/2008 | Simmons | |
| 7,381,899 B2 | * | 6/2008 | Pfluger | H02G 3/32 174/92 |
| 2003/0189140 A1 | | 10/2003 | Takeuchi | |
| 2004/0144899 A1 | | 7/2004 | Rosemann et al. | |
| 2006/0186278 A1 | * | 8/2006 | Tjerrild | F16L 3/133 248/65 |
| 2007/0184714 A1 | | 8/2007 | Pfluger | |

(Continued)

FOREIGN PATENT DOCUMENTS

| DE | 2208929 A1 | 8/1973 |
|---|---|---|
| DE | 10313866 A1 | 10/2003 |

(Continued)

OTHER PUBLICATIONS

The extended European search report issued by the European Patent Office on Jun. 10, 2015, which corresponds to European Patent Application No. 14169661.7-1503 and is related to U.S. Appl. No. 14/282,976.

*Primary Examiner* — Rodney Mintz
(74) *Attorney, Agent, or Firm* — Studebaker & Brackett PC

(57) ABSTRACT

Configured is a wiring support structure provided with a column portion fixed to or provided integrally with an installation object in which wiring is installed, and provided so as to project from the installation object, a wiring support portion having a wiring arrangement portion that is arrangeable so as to extend along the installation object and in which the wiring is arranged in an extending direction of the wiring arrangement portion, the wiring support portion being supported by the column portion in a state where the wiring support portion is separate from the installation object, and an attachment portion for attaching the wiring to the wiring arrangement portion.

8 Claims, 6 Drawing Sheets

(56) References Cited

U.S. PATENT DOCUMENTS

| | | | | |
|---|---|---|---|---|
| 2009/0126103 | A1* | 5/2009 | Dietrich | E03C 1/021 4/695 |
| 2011/0163208 | A1* | 7/2011 | Tjerrild | F16L 3/227 248/65 |
| 2012/0049013 | A1* | 3/2012 | Klein | H02G 3/32 248/74.1 |
| 2013/0104494 | A1* | 5/2013 | Evangelista | H02G 3/125 52/741.1 |
| 2014/0201954 | A1* | 7/2014 | Kuhm | F16L 3/1203 24/132 AA |
| 2014/0306071 | A1* | 10/2014 | Stechmann | H02G 3/32 248/74.1 |

FOREIGN PATENT DOCUMENTS

| | | |
|---|---|---|
| EP | 1424520 A1 | 6/2004 |
| EP | 1833133 A1 | 9/2007 |
| JP | 07-241006 A | 9/1995 |
| JP | 2003-278723 A | 10/2003 |

* cited by examiner

WIRING SUPPORT STRUCTURE

CROSS-REFERENCE TO RELATED APPLICATION

This application claims priority to Japanese Patent Application No. 2013-111210. The entire disclosure of Japanese Patent Application No. 2013-111210 is hereby incorporated herein by reference.

BACKGROUND OF THE INVENTION

1. Field of the Invention

The present invention relates to a wiring support structure for supporting wiring through which current runs.

2. Description of Related Art

Conventionally, a wiring support structure is known that is provided with a support member (column portion) installed in a projecting manner in a distribution board (installation object) serving as an object in which wiring is installed, and a fastening member (attachment portion) that ties the wiring to the support member, as disclosed in JP7-241006 A, for example. In this wiring support structure, a non-slip portion for preventing the attachment portion from sliding is formed on a circumferential wall of the column portion. Thus, the attachment portion does not easily slide with respect to the column portion, resulting in an improvement in stability in the state where the wiring tied to a tip portion of the column portion is supported and fixed.

SUMMARY OF THE INVENTION

Incidentally, some such distribution boards are mounted in a mobile body, such as, for example, an aircraft. In this case, since large vibrations are exerted on the distribution board, the wiring could possibly loosen with respect to the column portion.

To address this situation, it is conceivable to secure a certain distance between the wiring and other components or other wiring such that, even if the wiring loosens, they will not come into contact with and rub against other components or other wiring. It is also conceivable to narrow an interval between column portions in order to minimize loosening of the wiring. However, to widen the interval between the wiring and other components or the interval between the wiring and other wiring as mentioned above, a corresponding space is needed. Moreover, if the interval between the column portions is narrowed in order to reduce loosening of the wiring, the weight of the apparatus increases.

The present invention has been made in order to solve the foregoing problem, and it is an object of the present invention to provide a wiring support structure that enables space saving and a reduction in weight to be achieved.

(1) In order to solve the foregoing problem, a wiring support structure according to an aspect of the present invention is a wiring support structure including: a column portion fixed to or provided integrally with an installation object in which wiring is installed, and provided so as to project from the installation object; a wiring support portion having a wiring arrangement portion that is arrangeable so as to extend along the installation object and in which the wiring is arranged in an extending direction of the wiring arrangement portion, the wiring support portion being supported by the column portion in a state where the wiring support portion is separate from the installation object; and an attachment portion for attaching the wiring to the wiring arrangement portion.

With this configuration, the wiring can be retained in a state of being separate from the installation object by using the attachment portion to attach the wiring arranged in the wiring arrangement portion to the wiring arrangement portion. Thus, the wiring can be prevented from rubbing against the installation object.

Furthermore, the wiring can be prevented from loosening at a position horizontally separate from the column portion, by attaching the wiring to the wiring support portion having the wiring arrangement portion formed so as to extend along the installation object, as in the above configuration. With this configuration, it is not necessary to increase the distance between the wiring and another component or another wiring such that, in the case where the wiring loosens, the wiring does not come into contact with and rub against the other component or the other wiring, as in the conventional technique. Furthermore, it is not necessary to narrow the interval between column portions so as to reduce loosening of the wiring as in the conventional technique, and consequently, the required number of column portions can be reduced.

Accordingly, with this configuration, it is possible to provide a wiring support structure that enables space saving and a reduction in weight to be achieved.

(2) Preferably, the wiring support portion has a plate portion that is formed in a plate shape having a predetermined width and is arranged so as to face the installation object.

With this configuration, the plate portion formed in a plate shape is arranged so as to face the installation object, and therefore the height of the wiring support structure can be reduced.

(3) More preferably, at least one of the surfaces of the plate portion is provided as the wiring arrangement portion.

With this configuration, the wiring can be arranged on at least one of the surfaces of the plate portion formed in a plate shape, and therefore the height of the wiring support structure can be reduced while securing the arrangement space for the wiring in the wiring support portion.

(4) Preferably, the wiring support portion has a wall portion arranged so as to extend along the installation object, and at least one of one surface and the other surface of the wall portion is provided as the wiring arrangement portion.

With this configuration, the wiring arrangement portion is formed by the wall portion. Thus, the weight of the wiring arrangement portion can be reduced as compared with the case where the wiring arrangement portion is formed in a block shape, for example. Consequently, the weight of the entire wiring support structure can be reduced.

(5) More preferably, the wiring support portion has a plate portion that is formed in a plate shape having a predetermined width and is arranged so as to face the installation object, and the wall portion is formed on both end sides of the plate portion in a width direction thereof.

With this configuration, since the wall portion in which the wiring can be arranged is formed on both end sides of the plate portion in the width direction thereof, the arrangement space for the wiring can be increased while achieving a reduction in the height of the wiring support structure.

(6) Preferably, the wiring support portion has a groove portion serving as the wiring arrangement portion.

With this configuration, the wiring can be reliably arranged in the wiring arrangement portion by arranging the wiring in the groove portion.

(7) Preferably, the column portion and the wiring support portion are provided as separate members, and the wiring support portion is supported by the column portion in a state where the wiring support portion is separate from the installation object by being fixed to the column portion.

With this configuration, as compared with the case where the column portion and the wiring support portion are formed integrally with each other, the flexibility in the arrangement of the wiring support structure with respect to the installation object can be enhanced since the fixing position of the column portion with respect to the wiring support portion can be adjusted. Furthermore, since the number of column portions for supporting the wiring support portion can be increased or reduced according to the situation, the wiring support portion can be supported by the minimum necessary number of column portions. Consequently, a further reduction in the weight of the wiring support structure can be achieved.

(8) More preferably, at least one hole portion in which the column portion is arranged and fixed is formed in the wiring support portion.

With this configuration, portions for fixing the column portion to the wiring support portion can be easily formed by the hole portion. Moreover, as a result of forming the hole portion, a further reduction in the weight of the wiring support portion can be achieved.

(9) Preferably, the wiring support portion has a connecting portion that can be connected to another wiring support portion.

With this configuration, the wiring support portions connected to each other can be arranged with respect to the installation object, and therefore the flexibility in the arrangement of the wiring with respect to the installation object can be further enhanced.

(10) More preferably, the connecting portion has a tabular portion formed in a flat-plate shape.

With this configuration, connecting portions can be easily connected by overlaying the tabular portions of the wiring support portions one on the other and connecting these tabular portions to each other.

(11) Preferably, the attachment portion has a fastening mechanism that ties the wiring arranged in the wiring arrangement portion to the wiring arrangement portion.

With this configuration, the wiring can be easily attached to the wiring arrangement portion by using the fastening mechanism to tie the wiring arranged in the wiring arrangement portion to the wiring arrangement portion.

Note that the above and other objects, features, and advantages of the present invention will become apparent by reading the following description with the attached drawings.

DETAILED DESCRIPTION OF THE INVENTION

Hereinafter, a mode for carrying out the present invention will be described with reference to the drawings. Although not shown, a wiring support structure 1 according to an embodiment of the present invention is, as one example, used in a high-voltage power supply (a so-called rack-and-panel) mounted in an aircraft. However, this need not be the case, and the present invention can be widely applied to general equipment having a wiring support structure.

Configuration

Figure 1:
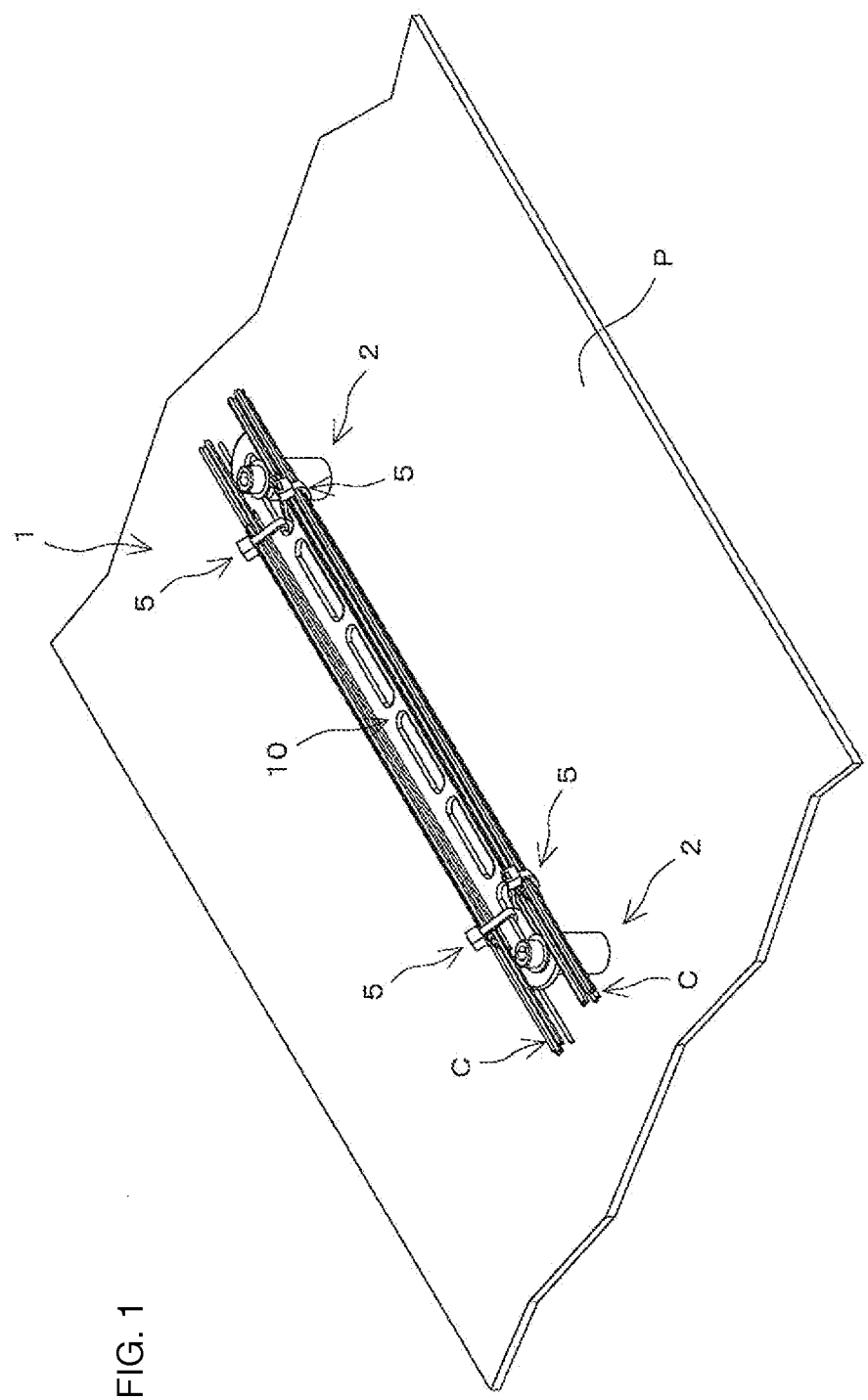
FIG. 1 is a perspective view showing an overall structure of a wiring support structure according to an embodiment of the present invention in a state where wiring is attached thereto.
Figure 2:
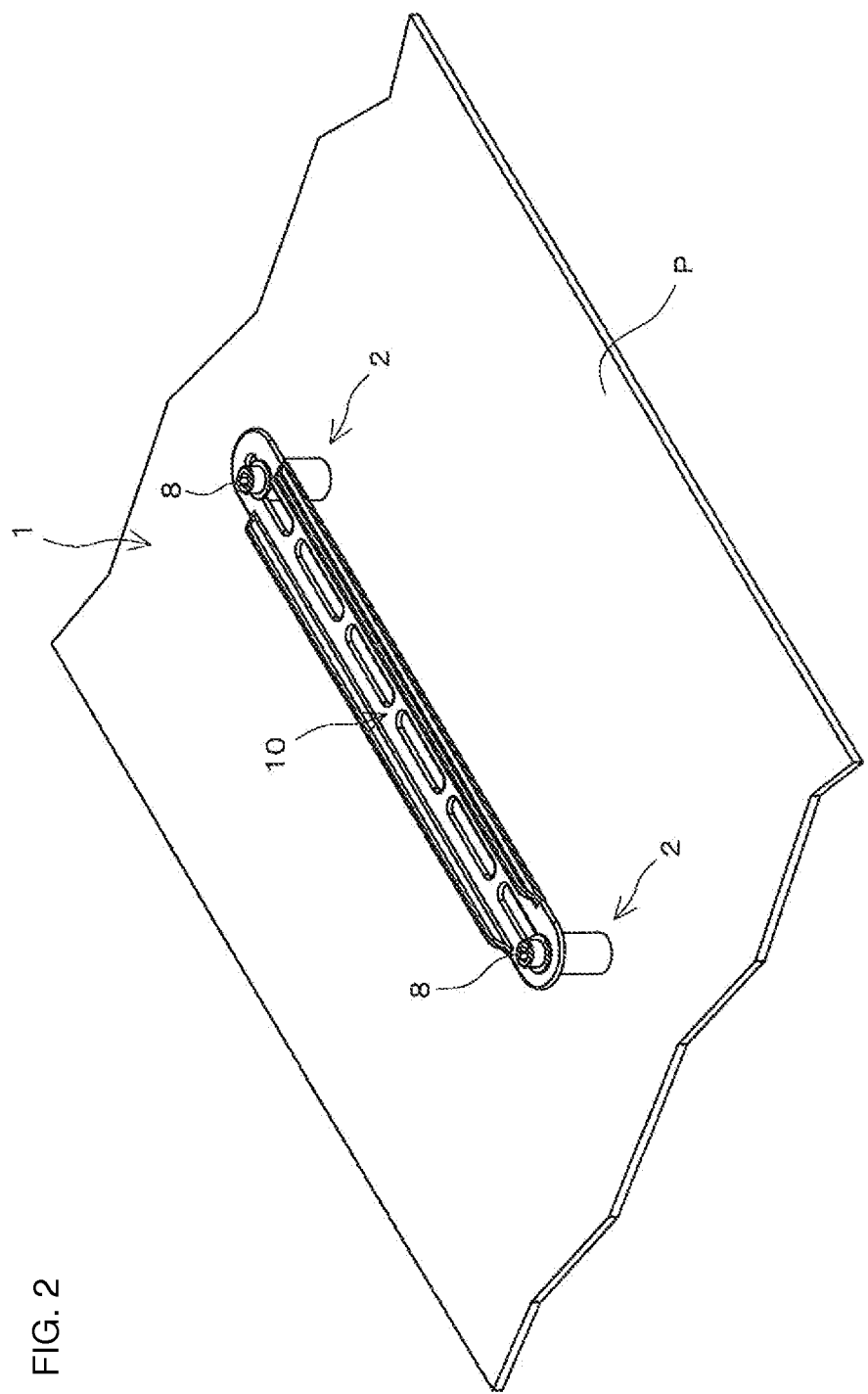
FIG. 2 is the same diagram as FIG. 1 except that the wiring and fastening bands are omitted.
Figure 3:
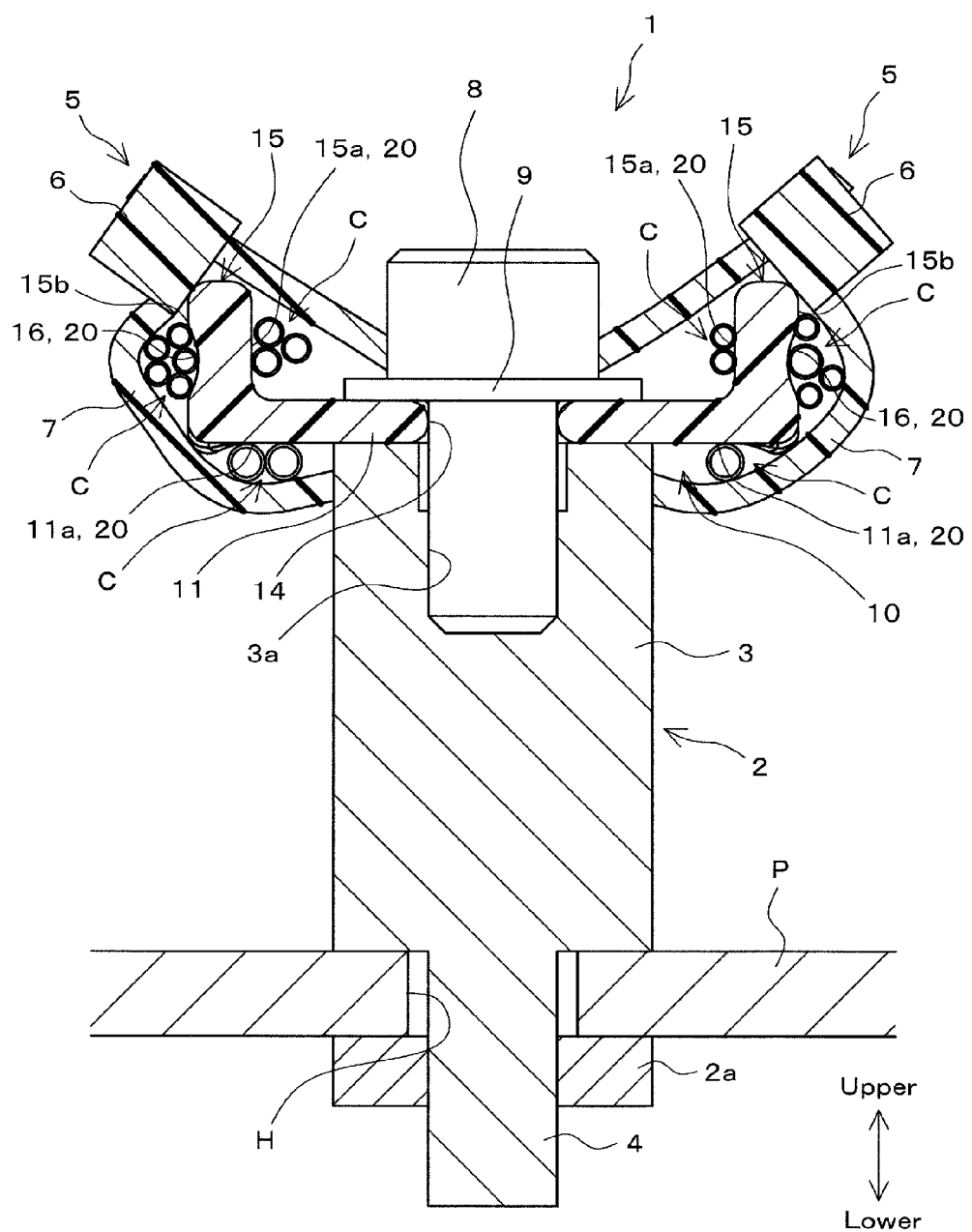
FIG. 3 is a cross-sectional view of the wiring support structure in a state where the wiring is attached thereto.

FIGS. 1 to 3 are diagrams for illustrating an overall structure of the wiring support structure 1 according to the embodiment of the present invention. FIG. 1 is a perspective view of the wiring support structure 1 in a state where wiring C is attached thereto, FIG. 2 is the same perspective view as FIG. 1 except that the wiring C and a part of components are omitted, and FIG. 3 is a cross-sectional view of the wiring support structure 1 in a state where the wiring C is attached thereto. Note that in the following description, the direction indicated by an arrow denoted as "Upper" in the diagrams will be referred to as an "upper side" or "upward", and the direction indicated by an arrow denoted as "Lower" in the diagrams will be referred to as a "lower side" or "downward", for the sake of convenience of description. The "up-down direction" corresponds to the direction in which a column portion projects.

As shown in FIGS. 1 to 3, the wiring support structure 1 is attached to a base plate P (installation object) of a high-voltage power supply. The wiring support structure 1 is provided with a pair of column portions 2 and 2, a wiring support portion 10, and a plurality of fastening bands 5 (fastening mechanism). Note that the wiring support structure 1 may be attached to other kinds of installation object, such as under the floor (not shown) and on the ceiling (not shown), which serve as installation objects, of an aircraft body.

As shown in FIG. 3 etc., each column portion 2 has a cylindrical portion 3 formed in a substantially cylindrical shape and a projecting portion 4 that projects downward from a surface of the cylindrical portion 3 on one end side thereof (lower side in FIG. 3), and the cylindrical portion 3 and the projecting portion 4 are formed integrally with each other. An external thread is formed on the outer-circumferential surface of the projecting portion 4. The projecting portion 4 of the column portion 2 is inserted in a hole portion H formed in the base plate P, and thereafter the column portion 2 is fixed by a nut 2a. Thus, the column portion 2 is fixed to the base plate P in a state where the column portion 2 is arranged so as to extend in the up-down direction. On the other hand, a screw hole 3a is formed on the other end side of the column portion 2 (upper side in FIG. 3) so as to extend in the axial direction of the cylindrical portion 3 from a surface of the column portion 2 on the other end side thereof, and has an internal thread formed on the inner-circumferential surface of the screw hole 3a. As shown in FIG. 1, the pair of column portions 2 and 2 are fixed to the base plate P at an interval from each other. Note that the column portions may be provided integrally with the base plate P.

Figure 4:
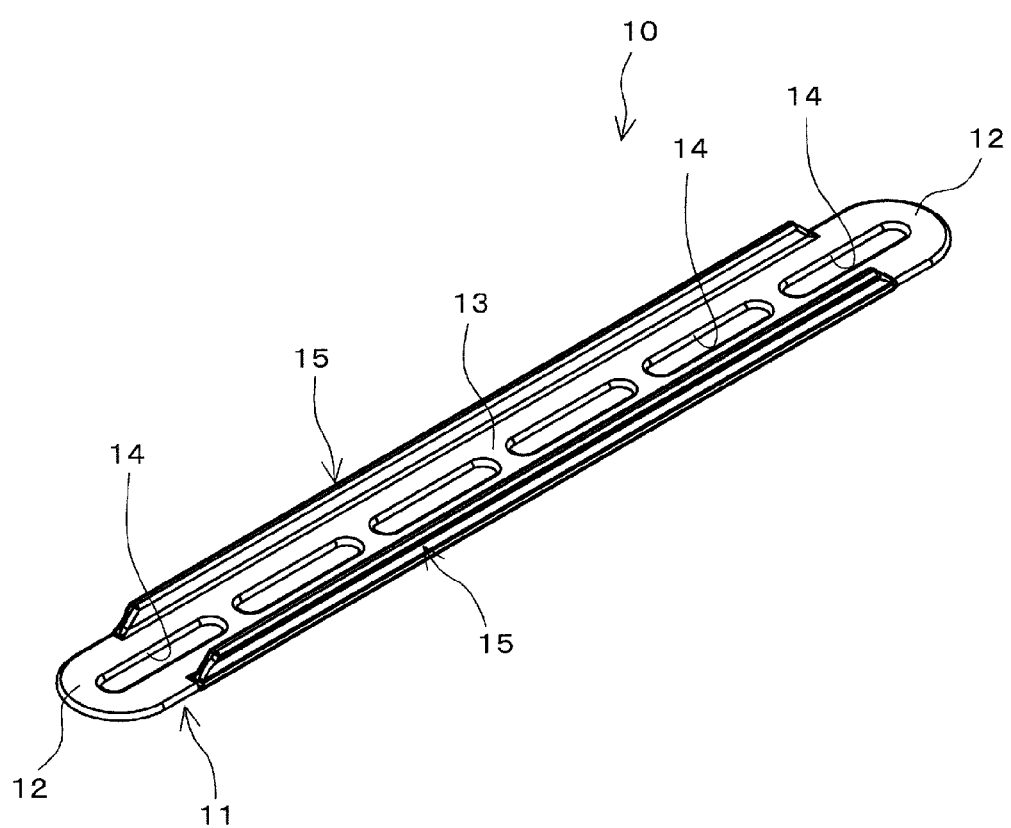
FIG. 4 is a perspective view of a wiring support portion shown in FIG. 1.
Figure 5:
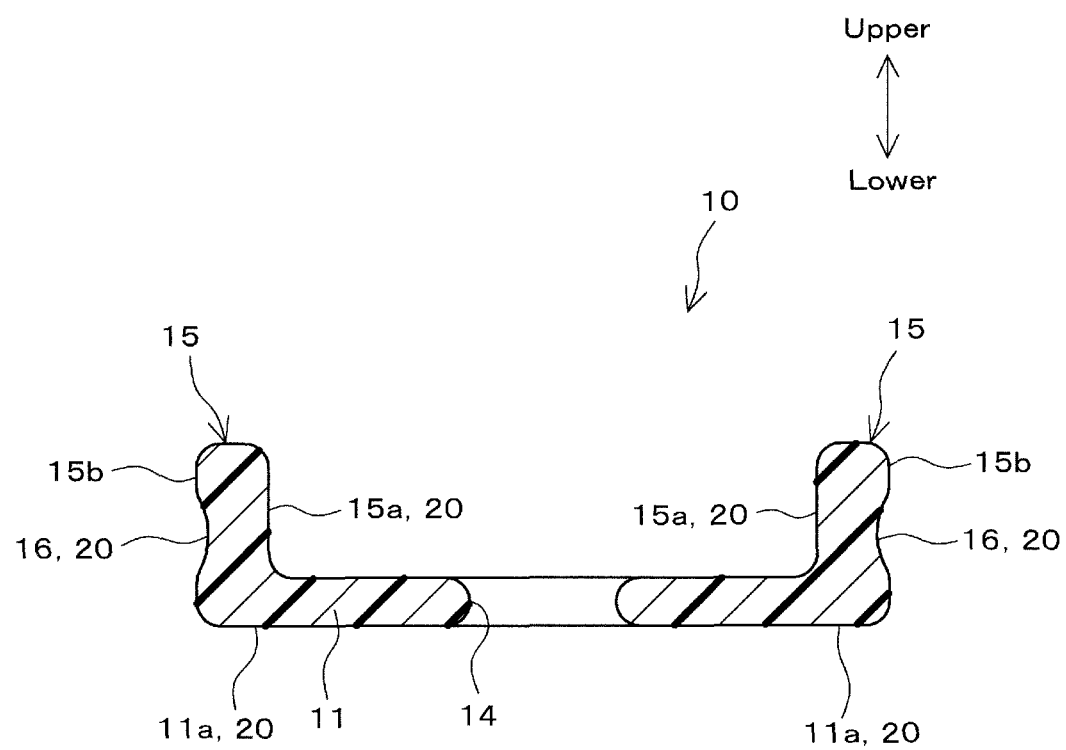
FIG. 5 is a lateral cross-sectional view of the wiring support portion shown in FIG. 1.

FIG. 4 is a perspective view of the wiring support portion 10, and FIG. 5 is a lateral cross-sectional view of the wiring support portion 10. The wiring support portion 10 is a narrow elongated member that is in a substantially plate-like shape and is provided as a separate member from the column portions 2, and portions of both ends of the wiring support portion 10 are fixed to and supported by upper end portions of the column portions 2. Thus, the wiring support portion 10 is fixed to the base plate P via the column portions 2 in a state where the wiring support portion 10 is separate from the base plate P. The wiring support portion 10 is made of a material having a certain degree of rigidity such that the wiring support portion 10 does not bend significantly under the self-weight of the wiring support portion 10 and under the self-weight of the wiring C attached to the wiring support portion 10. Specifically, the wiring support portion 10 is made of a relatively lightweight resin material, for example.

The wiring support portion 10 has a plate portion 11 and a pair of wall portions 15 and 15, and the plate portion 11 and the wall portions 15 and 15 are formed integrally with each other.

The plate portion 11 is a narrow elongated plate-like portion, both end portions of which are formed in a semicircular shape. A surface of the plate portion 11 on one side thereof faces the base plate P at an interval in a state where the plate portion 11 is supported by the column portions 2. The plate portion 11 is arranged so as to extend in an in-plane direction of the base plate P. Portions of both ends of the plate portion 11 in the longitudinal direction thereof are provided as plate end portions 12. An intermediate portion of the plate portion 11 in the longitudinal direction thereof (the portion of the plate portion 11 excluding the aforementioned plate end portions 12) is provided as a plate intermediate portion 13.

A plurality of hole portions 14 are formed in the plate portion 11. The hole portions 14 pass through the plate portion 11 in the thickness direction thereof. Each hole portion 14 has an elongated hole shape narrowly elongated in the extending direction of the plate portion 11, and a plurality of (in the present embodiment, six) hole portions 14 are formed at intervals in the extending direction of the plate portion 11. Portions of both ends of each hole portion 14 in the longitudinal direction thereof are formed in a semicircular shape.

The pair of wall portions 15 and 15 are formed on respective end portions of the plate portion 11 in the width direction thereof (a direction that is perpendicular to the extending direction of the plate portion 11 and is parallel to the base plate P). The wall portions 15 are formed in the plate intermediate portion 13 so as to extend in the longitudinal direction of the plate portion 11. The wall portions 15 are not formed in the plate end portions 12. The pair of wall portions 15 and 15 are formed so as to extend upward from the upper surface of the plate portion 11 such that wall surfaces of the wall portions 15 and 15 face each other.

As shown in FIGS. 3 and 5, a groove portion 16 is formed on a wall surface of each wall portion 15 on a side opposite to the plate portion 11 side. The groove portion 16 is formed so as to have a circular cross-section. The groove portion 16 is formed so as to extend from one end portion up to the other end portion of the wall portion 15 in the longitudinal direction thereof.

In the wiring support portion 10 having the above-described configuration, a portion 11a of the lower surface (the surface on the side where the wall portions 15 are not formed) of the plate portion 11 on the outside in the width direction thereof, an inner-wall surface 15a of each wall portion 15, and the groove portion 16 of this wall portion 15 are provided as a wiring arrangement portion 20. As shown in FIG. 3, the wiring C is arranged in the wiring arrangement portions 20. Note that the wiring C may be arranged in portions other than the aforementioned portion 11a, inner-wall surface 15a, and groove portion 16 in the wiring support portion 10.

The fastening bands 5 are used to bundle the wires such as cables and fix the wires to the wiring support portion 10. In the present embodiment, the fastening bands 5 are each provided as an attachment portion for attaching the wiring C to the corresponding wiring arrangement portion 20. Each fastening band 5 has a head portion 6 and a band portion 7. A through hole (not shown) passing through the head portion 6 is formed in the head portion 6. The band portion 7 is provided as a member that is attached to the head portion 6 and has a narrow elongated band shape.

In the wiring support structure 1, the plate end portions 12 of the wiring support portion 10 are placed on the upper end surfaces of the column portions 2 such that the wiring support portion 10 spans between the pair of column portions 2 fixed to the base plate P at a predetermined interval. The wiring support portion 10 is fastened to the column portions 2 by fixing screws 8 via washers 9. Thus, the wiring support portion 10 is supported by the column portions 2 in a state where the wiring support portion 10 is separate from the base plate P.

In the wiring support structure 1, the wiring C is arranged along the wiring arrangement portions 20, and is thereafter tied by the fastening bands 5. Specifically, as shown in FIG. 3 etc., each band portion 7 is locked by a locking portion (not shown) formed in the corresponding head portion 6 in a state where the band portion 7 is tied up so as to enclose the outside of the wiring C arranged in the wiring arrangement portions 20. The wiring C is thus attached to the wiring arrangement portions 20.

Effects

As described above, with the wiring support structure 1 according to the present embodiment, the wiring C arranged in the wiring arrangement portions 20 is attached to the wiring arrangement portions 20 by the fastening bands 5, and can be thereby retained in a state where the wiring C is separate from the base plate P. Thus, the wiring C is prevented from rubbing against the base plate P.

The wiring C can be prevented from loosening at a position separate from the column portions 2, by attaching the wiring C to the wiring support portion 10 having the wiring arrangement portions 20 formed so as to extend along the base plate P, as in the wiring support structure 1. With this configuration, it is not necessary to increase the distance between the wiring and other components or other wiring such that, in the case where the wiring loosens, the wiring does not come into contact with and rub against other components or other wiring, as in the conventional technique. Furthermore, it is not necessary to narrow the interval between the column portions so as to reduce loosening of the wiring as in the conventional technique, and consequently, the required number of column portions can be reduced.

Accordingly, with the wiring support structure 1, it is possible to provide a wiring support structure that enables space saving and a reduction in weight to be achieved.

With the wiring support structure 1, the plate portion 11 formed in a plate shape is arranged so as to face the base plate P, and therefore the height of the wiring support structure 1 can be reduced.

With the wiring support structure 1, the wiring C can be arranged in at least one (in the present embodiment, both) of the two surfaces of the plate portion 11 formed in a plate shape, and therefore the height of the wiring support structure 1 can be reduced while securing the arrangement space for the wiring C in the wiring support portion 10.

With the wiring support structure 1, the wiring arrangement portions 20 are formed by the wall portions 15. With this configuration, the weight of the wiring arrangement portions 20 can be reduced as compared with the case where the wiring arrangement portions 20 are formed in a block shape, for example. Consequently, the weight of the entire wiring support structure 1 can be reduced.

With the wiring support structure 1, since the wall portions 15 in which the wiring C can be arranged are formed on the respective end sides of the plate portion 11 in the width direction thereof, the arrangement space for the wiring C can be increased while achieving a reduction in the height of the wiring support structure 1.

With the wiring support structure 1, the wiring C can be reliably arranged in the wiring arrangement portions 20 by arranging the wiring C in the groove portions 16.

With the wiring support structure 1, as compared with the case where the column portions and the wiring support portion are formed integrally with each other, the flexibility in the arrangement of the wiring support structure 1 with respect to the base plate P can be enhanced since the fixing position of the column portions 2 with respect to the wiring support portion 10 can be adjusted. Furthermore, since the number of column portions 2 for supporting the wiring support portion 10 can be increased or reduced according to the situation, the wiring support portion 10 can be supported by the minimum necessary number of column portions 2. Consequently, a further reduction in the weight of the wiring support structure 1 can be achieved.

With the wiring support structure 1, portions for fixing the column portions 2 to the wiring support portion 10 can be easily formed by the hole portions 14. Moreover, as a result of forming the hole portions 14, a further reduction in the weight of the wiring support portion 10 can be achieved.

With the wiring support structure 1, the wiring C can be easily attached to the wiring arrangement portions 20 by using the fastening bands 5 to tie the wiring C arranged in the wiring arrangement portions 20 to the wiring arrangement portions 20.

With the wiring support structure 1, the wiring C can be arranged on both the inner wall side and the outer wall side of the wall portions 15. Thus, even if the wiring C on one side is burnt out, the wiring C on the other side can be prevented from being burnt out by the wall portions 15. With this configuration, for example, the redundancy of the system can be secured more reliably by arranging redundant cables on a wall surface on the other side to the side on which cables are normally arranged.

Although an embodiment of the present invention has been described above, the present invention is not limited to the above embodiment, and various modifications may be implemented within the scope recited in the claims. For example, the following modifications may be implemented.

Figure 6:
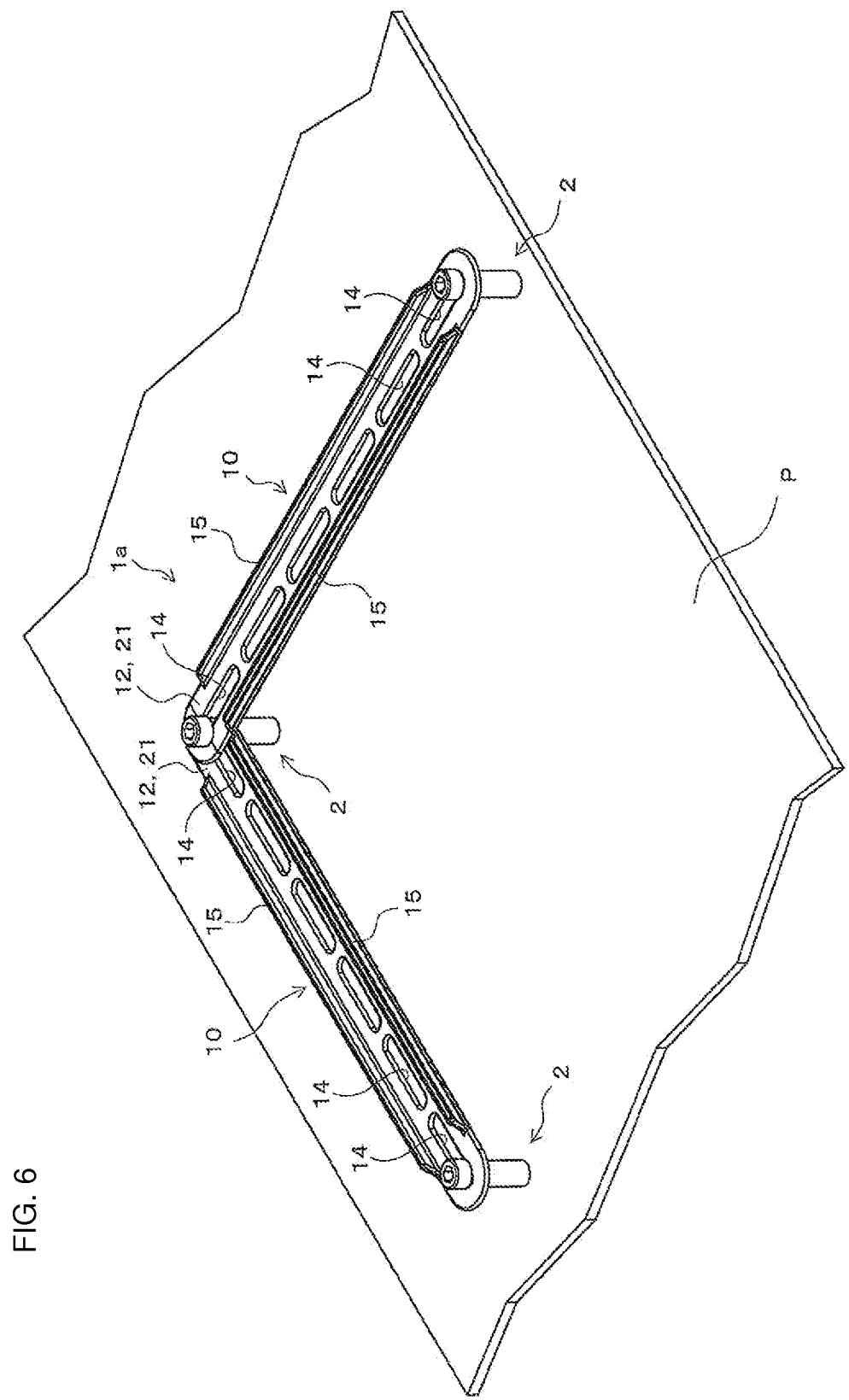
FIG. 6 is a perspective view showing an exemplary installation state of the wiring support structure with respect to a base plate, where the wiring and the fastening bands are omitted.

(1) FIG. 6 is a perspective view showing an exemplary installation state of a wiring support structure 1a with respect to the base plate P, where the wiring and the fastening bands are omitted. Although the wiring support structure 1 arranged such that the column portions 2 are attached to the respective end portions of one wiring support portion 10 has been described as an example in the above embodiment, the arrangement shown in FIG. 6 is also possible.

As shown in FIG. 6, the wiring support structure 1a has two wiring support portions 10 and three column portions 2. In the wiring support structure 1a, the two wiring support portions 10 are arranged in a substantially L-shape. Specifically, the two wiring support portions 10 are arranged in a substantially L-shape in a state where the plate end portion 12 of one of the two wiring support portions 10 on one side is overlaid on the plate end portion 12 of the other of the wiring support portions 10 on one side.

One of the three column portions 2 fixes the two overlaid plate end portions 12 to the base plate P in a state where this column portion 2 is inserted in the hole portion 14 of the two overlaid plate end portions 12. The remaining two column portions 2 fix, to the base plate P, the plate end portions 12 of the wiring support portions 10 other than the aforementioned overlaid plate end portions 12, in a state where the column portions 2 are inserted in the hole portions 14 of the plate end portions 12.

In the wiring support structure 1a, each of the two overlaid plate end portions 12 constitutes a connecting portion 21 that can be connected to the plate end portion 12 of the other wiring support portion 10. Each plate end portion 12 is provided as a tabular portion formed in a flat-plate shape. That is to say, the wall portions 15 are not formed in the plate end portions 12. Thus, the connecting portions 21 can be overlaid one on the other in close contact with each other.

As described above, with the wiring support structure 1a according to the present modification, the wiring support portions 10 connected to each other can be arranged with respect to the base plate P, and therefore the flexibility in the arrangement of the wiring C with respect to the base plate P can be further enhanced.

Furthermore, in the wiring support structure 1a, the connecting portions 21 can be easily connected to each other by overlaying the plate end portions 12 of the wiring support portions 10 one on the other and connecting these plate end portions 12 to each other.

Furthermore, in the case of the wiring support structure 1 according to the above embodiment, four column portions 2 are needed if two wiring support portions 10 are fixed to the base plate P. In contrast, with the wiring support structure 1a, two wiring support portions 10 can be fixed to the base plate P using three column portions 2. Thus, the weight of the wiring support structure 1a can be reduced.

(2) Although the column portions 2 and the wiring support portion 10 in the above embodiment are provided as separate members, this need not be the case, and the column portions 2 and the wiring support portion 10 may be formed integrally with each other. Furthermore, the column portions 2 may be provided integrally with the base plate P.

(3) Although the groove portions 16 in which the wiring C is arranged are formed in the wiring support portion 10 in the above embodiment, this need not be the case, and a configuration in which the groove portions 16 are omitted may alternatively be employed. Furthermore, although the wiring support portion 10 in the above embodiment has the wall portions 15 in which the wiring C is arranged, this need not be the case, and a configuration in which the wall portions 15 are omitted may alternatively be employed.

(4) Although the column portions 2 are fixed in the hole portions 14 formed in the wiring support portion 10 on the respective end sides in the above embodiment, this need not be the case, and the column portions 2 may alternatively be fixed to the other hole portions 14. Furthermore, although the plurality of hole portions 14 are formed in the wiring support portion 10 in the above embodiment, this need not be the case, and only one hole portion 14 may be formed therein.

(5) Although the fastening bands are used as the attachment portions for attaching the wiring C to the wiring support portion 10 in the above embodiment, this need not be the case, and any kind of attachment portion may be used as long as the wiring C can be attached to the wiring support portion 10. For example, the wiring C may be attached to the wiring support portion 10 in a state where the wiring C is hooked onto a hook-like portion fixed to or formed integrally with the wiring support portion 10. Alternatively, the wiring C may be attached to the wiring support portion 10 in a state where the wiring C is held by a hinge portion that is formed in a hinge-like shape and has an engaging portion (not shown) and an engaged portion (not shown) which engage with each other.

(6) Although the connecting portions 21 are formed in the respective end portions of the wiring support portion 10 in the above modification, this need not be the case, and the connecting portions 21 may be formed in the plate intermediate portion 13 of the wiring support portion 10. Alternatively, a configuration in which the connecting portions 21 are omitted may be employed.

(7) The cross-sectional shape of the wiring support portion 10 is not limited to the shape described in the above embodiment, and may be formed in other kinds of shape, e.g., in a substantially L-shape, a substantially H-shape, and a substantially I-shape. The wiring arrangement portion can be provided as appropriate with respect to each of the thus-formed cross-sectional shapes.

The present invention can be widely applied to a wiring support structure for supporting wiring. The present invention is not limited to the above embodiment, and all modifications, applications, and equivalents thereof that fall within the claims, for which modifications and applications would become naturally apparent by reading and understanding the present specification, are intended to be embraced therein.

What is claimed is:

1. A wiring support structure comprising:
   a column portion fixed to or provided integrally with an installation object in which wiring is installed, and provided so as to project from the installation object;
   a wiring support portion having a wiring arrangement portion that is arrangeable so as to extend along the installation object and in which the wiring is arranged in an extending direction of the wiring arrangement portion, the wiring support portion being supported by the column portion in a state where the wiring support portion is separate from the installation object; and
   an attachment portion for attaching the wiring to the wiring arrangement portion,
   wherein the wiring support portion has a plate portion that is formed in a plate shape having a predetermined width and is arranged so as to face the installation object,
   wherein the wiring support portion has a wall portion arranged so as to extend along the installation object, and at least a first of one surface and a second surface of the wall portion is provided as the wiring arrangement portion,
   wherein the wiring support portion has a groove portion serving as the wiring arrangement portion, and
   wherein the groove portion is formed on a wall surface of the wall portion on a side opposite to a plate portion side.

2. The wiring support structure according to claim 1, wherein the attachment portion has a fastening mechanism that ties the wiring arranged in the wiring arrangement portion to the wiring arrangement portion.

3. The wiring support structure according to claim 1, wherein at least one surface of the plate portion is provided as the wiring arrangement portion.

4. The wiring support structure according to claim 1, wherein the wall portion is formed on both end sides of the plate portion in a width direction thereof.

5. The wiring support structure according to claim 1, wherein the column portion and the wiring support portion are provided as separate members, and the wiring support portion is supported by the column portion in a state where the wiring support portion is separate from the installation object by being fixed to the column portion.

6. The wiring support structure according to claim 5, wherein at least one hole portion in which the column portion is arranged and fixed is formed in the wiring support portion.

7. The wiring support structure according to claim 1, wherein the wiring support portion has a connecting portion that is connectable to another wiring support portion.

8. The wiring support structure according to claim 7, wherein the connecting portion has a tabular portion formed in a flat-plate shape.

\* \* \* \* \*